US010098136B1

(12) United States Patent
Jorgovanovic et al.

(10) Patent No.: US 10,098,136 B1
(45) Date of Patent: Oct. 9, 2018

(54) TRANSMIT POWER AND RECEIVE GAIN ADJUSTMENTS IN MULTI-RADIO DEVICES

(71) Applicant: Amazon Technologies, Inc., Seattle, WA (US)

(72) Inventors: Milos Jorgovanovic, Mountain View, CA (US); Pratik Kalpesh Patel, Sunnyvale, CA (US); Ateet Kapur, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/637,840

(22) Filed: Jun. 29, 2017

(51) Int. Cl.
| | | |
|---|---|---|
| *H04B 17/02* | (2006.01) | |
| *H04W 72/12* | (2009.01) | |
| *H04W 72/04* | (2009.01) | |
| *H04W 52/36* | (2009.01) | |
| *H04W 88/06* | (2009.01) | |
| *H04W 48/18* | (2009.01) | |
| *H04W 52/28* | (2009.01) | |
| *H04W 16/14* | (2009.01) | |

(52) U.S. Cl.
CPC ....... *H04W 72/1215* (2013.01); *H04W 16/14* (2013.01); *H04W 48/18* (2013.01); *H04W 52/287* (2013.01); *H04W 52/367* (2013.01); *H04W 72/0473* (2013.01); *H04W 88/06* (2013.01)

(58) Field of Classification Search
CPC . H04W 72/1215; H04W 16/14; H04W 48/18; H04W 52/287; H04W 52/367; H04W 72/0473; H04W 88/06

USPC ......................................................... 455/137
See application file for complete search history.

(56) References Cited

U.S. PATENT DOCUMENTS

| | | | |
|---|---|---|---|
| 7,809,399 | B2 | 10/2010 | Lu et al. |
| 7,826,459 | B2 | 11/2010 | Xhafa et al. |
| 8,346,171 | B1 | 1/2013 | Mack |
| 2007/0066222 | A1 | 3/2007 | Tao et al. |
| 2007/0206631 | A1 | 9/2007 | Parts et al. |
| 2007/0224936 | A1* | 9/2007 | Desai .................. H04W 52/242 455/41.2 |
| 2008/0045152 | A1 | 2/2008 | Boes |
| 2008/0144493 | A1 | 6/2008 | Yeh |
| 2009/0257379 | A1 | 10/2009 | Robinson et al. |
| 2009/0298530 | A1 | 12/2009 | Armstrong |
| 2009/0325625 | A1 | 12/2009 | Hugl et al. |
| 2010/0008338 | A1 | 1/2010 | Tsfati et al. |
| 2010/0172254 | A1 | 7/2010 | Sachs |

(Continued)

*Primary Examiner* — Sanh Phu
(74) *Attorney, Agent, or Firm* — Pierce Atwood LLP

(57) ABSTRACT

A multi-radio wireless device capable of communicating on several wireless communication protocols (WCP) such as Wi-Fi, Bluetooth, etc. while avoiding on-device interference between radios operating using different WCPs. The device may measure an isolation value between radios during a calibration phase. During runtime operations, if a transmit activity is detected, the device may set a maximum receive gain using the expected transmit power and the isolation value. If a receive activity is detected, the device may set a maximum transmit power using an expected receive gain and the isolation value. The maximum receive gain and/or transmit powers may be obtained from a lookup table matching receive gain values to reference values where the reference values are a combination of transmit powers and isolation values.

23 Claims, 6 Drawing Sheets

(56) References Cited

U.S. PATENT DOCUMENTS

| | | |
|---|---|---|
| 2010/0197235 A1 | 8/2010 | Wilhelmsson |
| 2010/0197316 A1 | 8/2010 | Aoyama et al. |
| 2010/0246463 A1 | 9/2010 | Papasakellariou et al. |
| 2011/0009136 A1 | 1/2011 | Mantravadi et al. |
| 2012/0033645 A1 | 2/2012 | Mantravadi et al. |
| 2012/0040715 A1 | 2/2012 | Fu et al. |
| 2012/0060158 A1 | 3/2012 | Kadous et al. |
| 2012/0071103 A1 | 3/2012 | Kadous et al. |
| 2012/0163307 A1 | 6/2012 | Wang et al. |
| 2012/0164948 A1 | 6/2012 | Narasimha et al. |
| 2012/0307749 A1 | 12/2012 | Banister et al. |
| 2012/0327913 A1 | 12/2012 | Wang et al. |
| 2013/0010766 A1 | 1/2013 | Sadek et al. |
| 2013/0064111 A1 | 3/2013 | Linsky et al. |
| 2016/0381647 A1* | 12/2016 | Shahar .................. H04W 52/52 370/252 |

\* cited by examiner

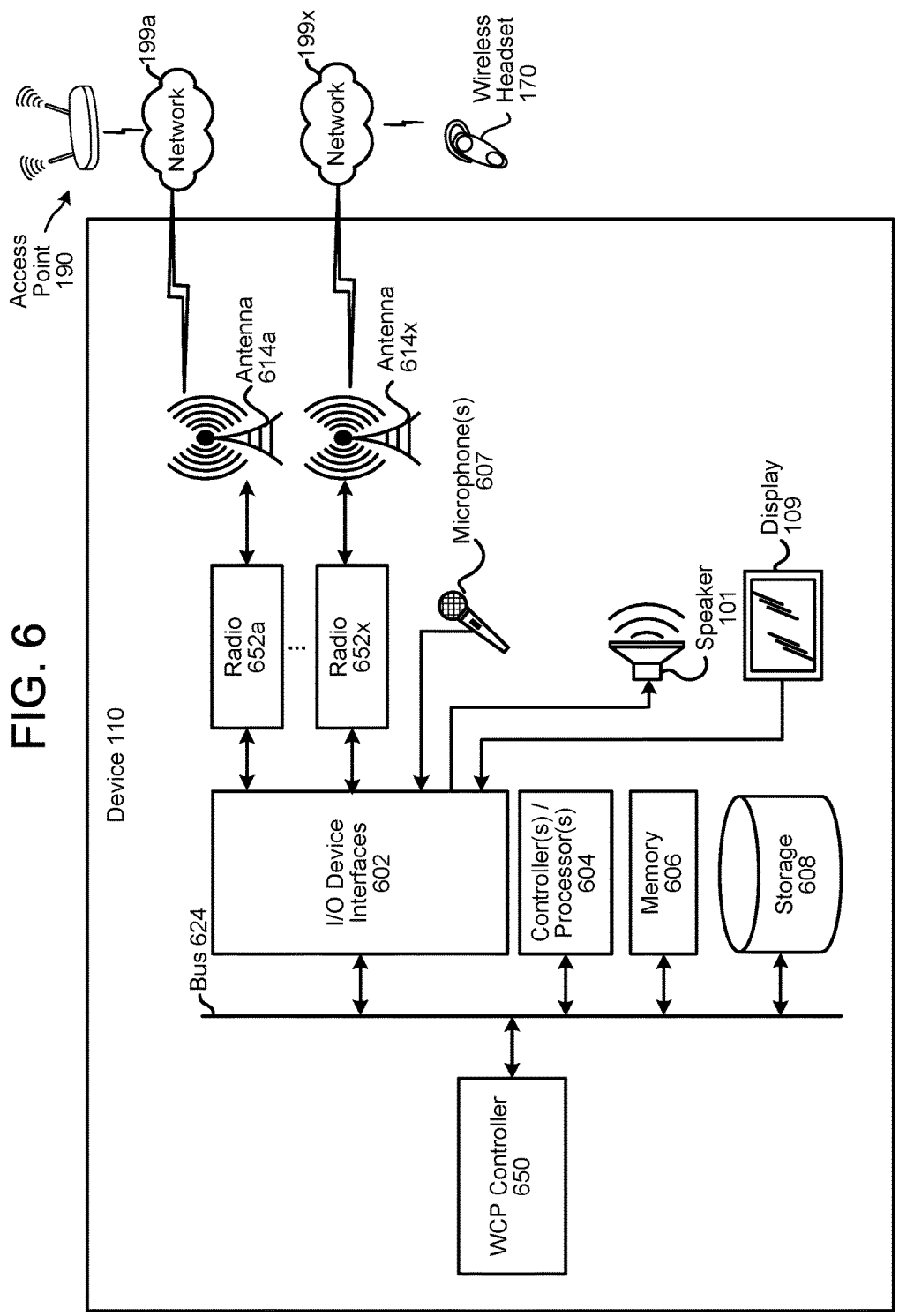

TRANSMIT POWER AND RECEIVE GAIN ADJUSTMENTS IN MULTI-RADIO DEVICES

BACKGROUND

Computing devices may include radios and other communication components for engaging in wireless communications with other devices. Certain devices may also include multiple radios for communicating with multiple different devices at the same time.

BRIEF DESCRIPTION OF DRAWINGS

For a more complete understanding of the present disclosure, reference is now made to the following description taken in conjunction with the accompanying drawings.

FIG. 6 is a block diagram conceptually illustrating example components of a device according to embodiments of the present disclosure.

DETAILED DESCRIPTION

Figure 1:
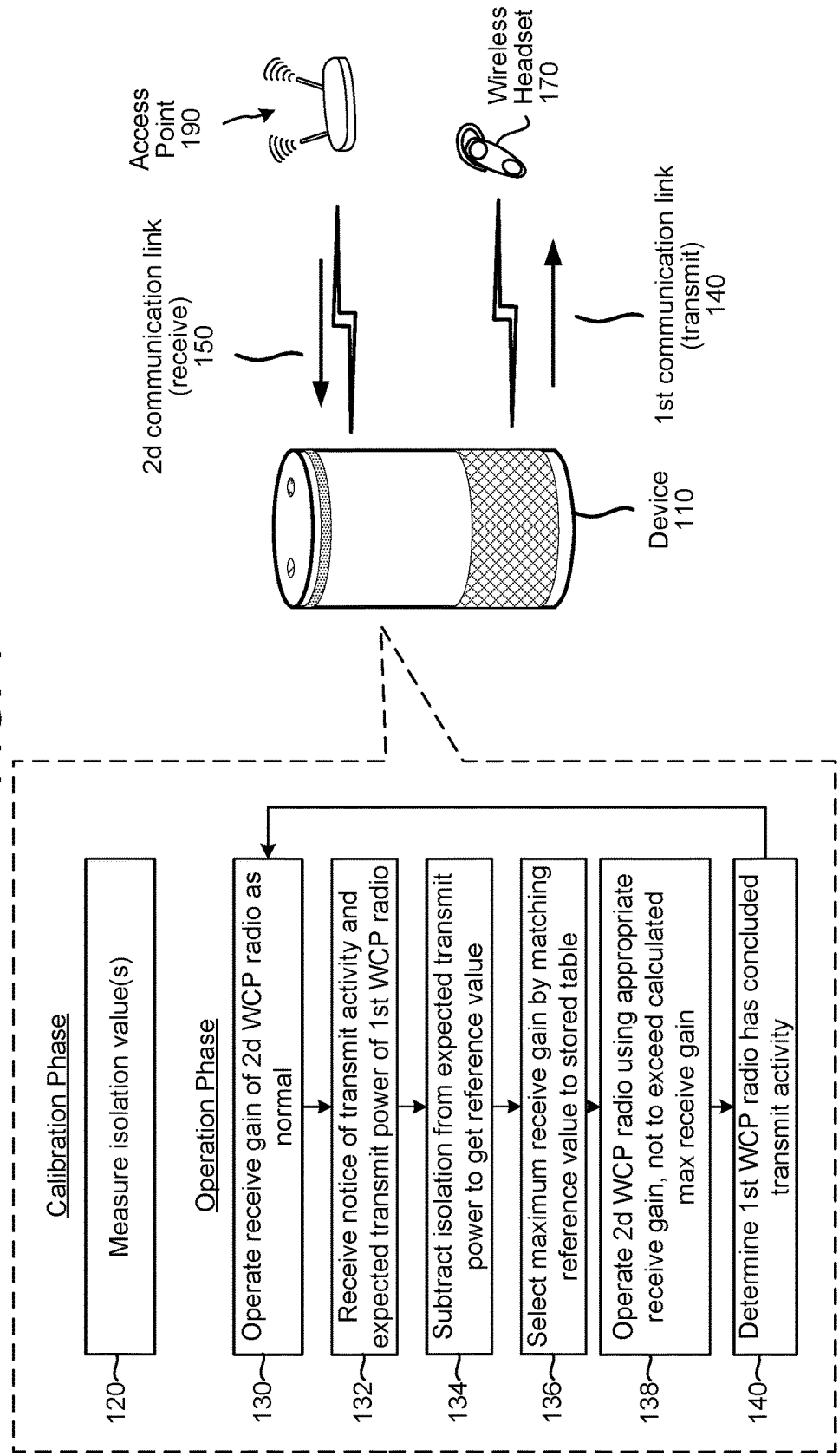
FIG. 1 illustrates a system for managing wireless communications on a multi-radio wireless communication device according to embodiments of the present disclosure.

To enable these communications the local speech device may be equipped to communicate using several different wireless communication protocols (WCPs) including Wi-Fi (for example for internet communications with the speech processing system), Bluetooth and/or Bluetooth Low Energy (BTLE) (for communication with peripherals such as speakers, headphones, or the like), ZigBee (for communication with light switches, appliances, etc.), and/or others.

To communicate using multiple WCPs may involve the local speech device being configured with multiple radios. In certain instances operation of one radio may interfere with operation of another radio through radiative, conductive, resource collision, and/or other interference mechanisms. For example, in full-duplex mode when radios may operate concurrently, when one radio is transmitting it may interfere with another radio's ability to receive, particularly if the radios are using adjacent or colliding communication resources, such as wireless frequency channels. In such a situation the radio that is transmitting and causing interference may be referred to as the aggressor radio and the radio that is receiving and experiencing the interference may be referred to as the victim radio. Interference to the radios may take several forms including in-device interference (e.g., activity from one radio on the device may interfere with another radio on the device) or off-device interference (e.g., activity from one radio on some other device may interfere with a radio on the device). To combat such interference a device may be configured to operate in different manners under different communication conditions.

Many different techniques may be proposed to address such cross-radio interference problems. One solution technique focuses on scheduling communications among the radios so that one radio is not operating at the same time as other radios. Such a technique is called time-division multiplexing (TDM) and involves configuring the radios and/or a radio controller to have detailed a priori information about the operation/scheduling of the radios. Less intelligent forms of TDM solutions simply shut off one radio while the other is communication. Other techniques involve aggressive power control by either backing off (reducing a transmit power) a transmitting radio or desensing (reducing a receiver gain) a receiving radio.

For example, in a device with two radios, each configured to operate using a different wireless communication protocol (WCP), if a potential aggressor radio is operating, even if not actively transmitting, the potential victim radio may simply enter a desense mode to avoid interference. If active aggressor transmissions are not occurring, the desense mode may negatively affect the victim radio, even when the desense isn't necessary due to the lack of active transmission on the part of the aggressor radio. Such a situation may happen, for example, with a potential aggressor Bluetooth radio that may keep open a communication link between a first device and a second device, but only may sporadically transmit communication packets on the link. Any potential victim radio (such as a Wi-Fi radio) on the first device that desenses while the communication link is open, may be doing so unnecessarily. Alternatively, the potential victim radio may simply ignore the potential aggressor radio and suffer the interference losses that may result while the aggressor radio is transmitting.

To improve device operation, offered is a device and system to adjust a maximum transmit power when sending communications using a first WCP to avoid causing interference to receive activities of a second WCP. The power reduction may be based on WCP isolation measurements specific to the physical radio configuration of the device. Further, the receiver gain for the second WCP may also be set to a maximum range based on the WCP isolation measurements. The maximum levels may only be applied when both radios are actively communicating, thus combining both power control and TDM techniques. The techniques may be applied on a packet-level basis, that is only when a transmission activity of the first WCP is forthcoming will the max transmit power or max receive gain be applied. In this manner, the transmission management techniques may only be implemented when actually necessary.

As shown in FIG. 1, a device 110 may include multiple radios capable of communicating over different communication links (using different WCPs) during overlapping times. For example, device 110 may include a first radio configured to communicate using a first WCP (e.g., Bluetooth) over a first communication link 140. The first communication link 140 may be between the device 110 and another device, such as second device wireless headset 170. The device 110 may also include a second radio configured to communicate using a second WCP (e.g., Wi-Fi) over a second communication link 150. The second communication link 160 may be between the device 110 and another device, such as third device access point (AP) 190.

During a calibration phase the device may measure (120) one or more isolation values that measure the impact of the first WCP radio to the second WCP radio when the first radio is transmitting using a first antenna and the second radio is receiving using a second antenna. Isolation values measuring the impact among different combination of operating radios (such as for a device with more than two antennas) may also be calculated. Using the measured isolation value, during operation the device may then refer to one or more look-up tables (or other data structures) that store different operating values for the different radios relative to particular reference values and/or value ranges that depend on the measured isolation value.

For example, during an operation phase, the device may regulate the behavior of a receiving radio using the measured isolation value and a lookup table that is stored on the device. First the device 110 may operate (130) the second WCP radio using a receive (Rx) gain normally. The device 110 may then receive (132) notice of a transmit (Tx) activity and expected transmit power of the first WCP radio. The device 110 may then calculate (134) a reference value by subtracting the isolation value from the expected transmit power of the first WCP radio. The device may then select (136) a maximum Rx gain from the lookup table by matching the calculated reference value with a corresponding maximum Rx gain in the lookup table. The device 110 may then operate (138) the second WCP radio using an appropriate Rx gain for the receive activity, the appropriate Rx gain not to exceed the calculated maximum Rx gain. The device 110 may then determine (140) that that the first WCP radio has concluded its Tx activity and may return to operating (130) the second WCP radio as normal.

As noted above, the device 110 may be configured to communicate using multiple WCPs. For example, a device 110 may include a first radio configured to communicate using a Wi-Fi WCP. Wi-Fi is a wireless communication protocol that is generally governed by the Institute of Electrical and Electronics Engineers (IEEE) 802.11 standard. Wi-Fi is commonly used to engage in internet communications. Wi-Fi may operate in a number of different wireless frequency bands including the 2.4 GHz, 3.6 GHz, 4.9 GHz, 5 GHz, and 5.9 GHz bands. In particular, the 2.4 GHz band (e.g., 2.4-2.5 GHz) is, in the United States, part of the industrial, scientific and medical (ISM) radio band used for various purposes.

Another WCP that uses the ISM band, and that may be used by the device 110, is ZigBee. ZigBee may operate in the United States in the 2.4 GHz band. A ZigBee WCP may operate according to the IEEE 802.15.4 standard. ZigBee communications tend to be lower power than Wi-Fi communications. ZigBee communications may involve operating using a carrier sense multiple access (CSMA) communication protocol. Other ISM WCPs that may be used by the device 110 include Bluetooth, Bluetooth low energy (BTLE) and potentially others.

For each WCP capable of being used by the device 110, the device 110 may have a dedicated radio 652, discussed below in reference to FIG. 6.

Figure 2:
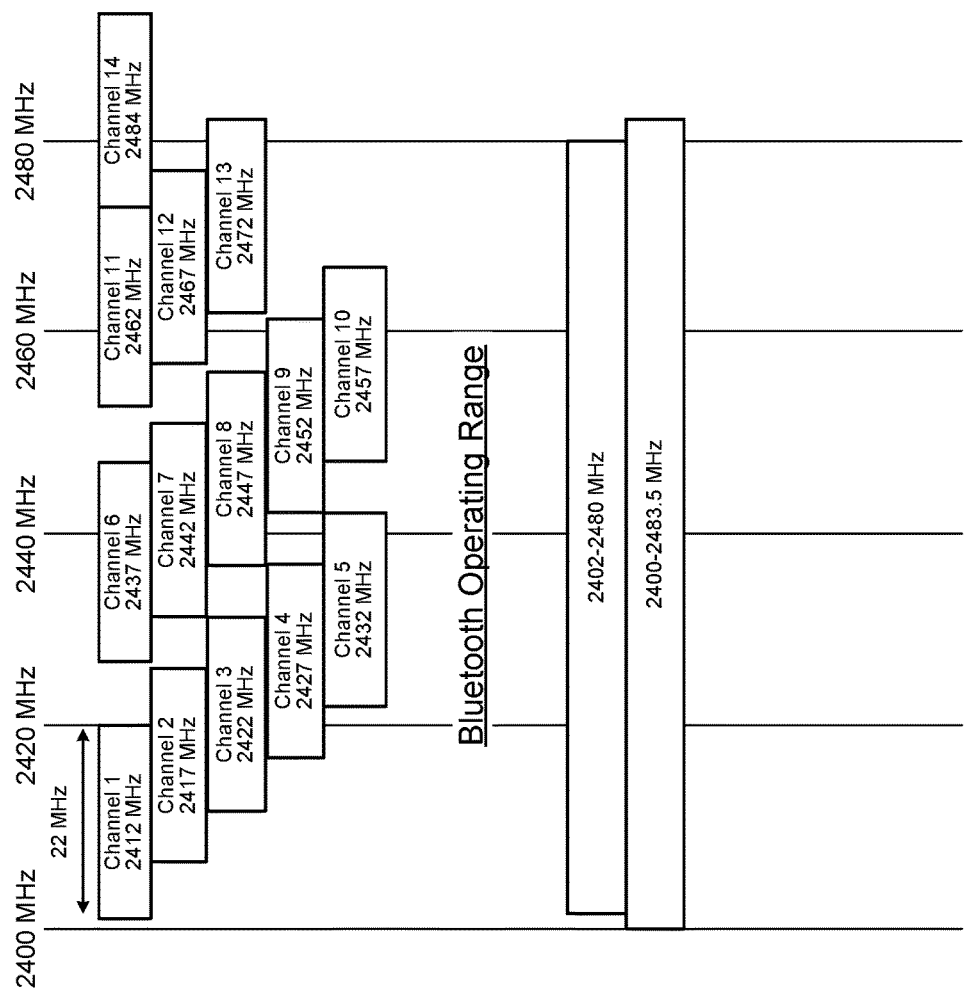
FIG. 2 illustrates Wi-Fi channels and a Bluetooth communication range in the 2.4 GHz wireless spectrum band.

As discussed above, WCPs that use adjacent or overlapping communication resources may cause interference to each other. For example, the channels used by Wi-Fi and frequency ranges of Bluetooth are illustrated in FIG. 2. As shown in FIG. 2, a Wi-Fi channel is approximately 22 MHz wide with varying center frequencies, with each channel having a center frequency offset from the previous channel by 5 MHz. For example, Wi-Fi channel 1 has a center frequency of 2412 MHz, Wi-Fi channel 2 has a center frequency of 2417 MHz and so on. As also shown in FIG. 2, Bluetooth operates at frequencies between 2402 and 2480 MHz or between 2400 and 2483.5 MHz with guard bands of 2 MHz wide at the bottom end and 3.5 MHz wide at the top. This range is within the ISM radio band. While FIG. 2 illustrates potential channel conflicts between Wi-Fi and Bluetooth in the 2.4 GHz band, other channel conflicts between other WCPs and other frequency bands are also possible and may be addressed by the techniques described herein.

Bluetooth also uses a radio technology called frequency-hopping spread spectrum. Bluetooth divides transmitted data into packets, and transmits each packet on one of 79 designated Bluetooth channels. Each channel has a bandwidth of 1 MHz. Bluetooth usually performs 800 hops per second, with Adaptive Frequency-Hopping (AFH) enabled. For each packet to be transmitted, a Bluetooth radio may select a new transmit power and new frequency from the previous transmitted packet. Thus, for an ongoing Bluetooth communication link, different packets may be sent on different frequencies using different transmit powers.

If a Wi-Fi radio on a device 110 is communicating using a particular Wi-Fi channel (e.g., Wi-Fi channel 1) it may cause interference to communications of a Bluetooth radio of the device 110 when attempting to communicate using an overlapping frequency and vice-versa. Further, conflicts may also occur even if communication frequencies are adjacent but not necessarily overlapping (due to signal bleed and/or other factors). To avoid such internal conflicts the device 110 may be configured with intelligence and components (for example WCP controller 650 discussed in reference to FIG. 6) that, for example, regulates transmit power and receive gain to potential radio interference conflicts as explained below.

During manufacturing of the device, as part of the firmware or other memory of the device, the device may be configured with one or more stored table(s) that compare different potential operating communication settings (e.g., receive gain or transmit power) with reference values based on a particular measured isolation so that the device knows how to set a maximum receive gain or maximum transmit power during runtime based on the current other communications settings. Although the device may be configured with multiple tables to account for different antenna operation scenarios, the discussion below focuses on tables for the example of one single antenna of the first WCP transmitting and one antenna of the second WCP receiving.

In one example, the device 110 may be configured with a table to be used to select a maximum Rx gain for the second WCP radio based on a particular transmit power of the first WCP radio. An example of such a table is shown below in Table 1:

TABLE 1

| Reference Value (1 WCP Tx power - ISO) | Max 2 WCP Rx gain |
| --- | --- |
| [−20, −10] dBm | 25 dB (min value) |
| [−35, −20] dBm | 30 dB |
| [−50, −35] dBm | 45 dB |
| Less than −50 dBm | 60 dB (max value) |

As shown in Table 1, a particular maximum receive gain for a second WCP radio may be matched with a particular range of reference values, where the reference value range represents a transmit power for a first WCP radio minus the isolation (ISO). The reference value range may represent a maximum level of noise from the first WCP that is acceptable in the receiver of the second WCP. As shown in Table 1, a reference value range of between −20 and −10 dBm may correspond to a listed maximum Rx gain of 25 dB, which may be the minimum capable Rx gain value for the second WCP radio. As noted in Table 1, certain Rx gain values may correspond to a minimum value or a maximum value. Those min/max values may depend on the physical radio and other components of the device as configured during manufacture of the device 110. In another example range, a reference value range of between −35 and −20 dBm may correspond to a listed maximum Rx gain of 30 dB, and so forth.

Thus, during operation the device 110 may calculate a reference value by subtracting the isolation value measured during the calibration phase from the expected transmit power of the transmit activity of the first WCP. The device 110 may then compare that calculated reference value to the entries in a stored table such as Table 1 to determine the maximum Rx gain for the second WCP. For example, if the measured isolation value is 20 dBm and the expected transmit power is 5 dBm, the device may calculate a reference value of −15 dBm, which is in between the range of −20 dBm to −10 dBm, thus resulting in the device selecting a maximum receive gain of 25 dB.

As can be appreciated, different values for the entries in Table 1 may be configured depending on the communication capabilities of device 110. Further, Table 1 may be configured with specific reference values rather than ranges.

In another example, the device 110 may be configured with a table to be used to select a maximum Tx power for the first WCP radio based on a particular receive gain of the second WCP radio. An example of such a table is shown below in Table 2:

TABLE 2

| 2 WCP Rx gain | Reference Value (1 WCP Max Tx power - ISO) |
| --- | --- |
| 25 dB (min value) | −10 dBm |
| 30 dB | −20 dBm |
| 45 dB | −35 dBm |
| 60 dB (max value) | −50 dBm |

As shown in Table 2, a particular reference value (representing a maximum transmit power for a first WCP radio minus the isolation (ISO)) may be matched with a particular expected receive gain for the second WCP radio. The reference values in Table 2 may represent a maximum level of first WCP interference for a given second WCP Rx gain. As shown in Table 2, a second WCP Rx gain of 25 dB may correspond to a listed reference value of −10 dBm, a second WCP Rx gain of 30 dB may correspond to a listed reference value of −20 dBM, and so forth.

Thus, during operation the device 110 may take an expected Rx gain for receive activity of the second WCP and use that expected Rx gain to reference a stored table such as Table 2. The device 110 may select the reference value corresponding to the expected Rx gain and add the isolation value back to that reference value to obtain the maximum transmit power for the first WCP radio. For example, if the expected second WCP receive gain is 25 dB, the device may select a reference value of −10 dBm. The device may then add to that reference value the measured isolation (for example, 20 dBm) to arrive at a maximum transmit power of 10 dBm.

As can be appreciated, different values for the entries in Table 2 may be configured depending on the communication capabilities of device 110. Further, Table 2 may be configured with ranges rather than specific values.

The lookup tables (or other data structures providing a link between Tx powers of at least one radio to Rx gains of at lease one other radio) may be stored on a device to be accessed at runtime. Such tables may updated through processes such as firmware updates or the like, as needed by the device 110. Operation of the device 110 using the tables may, as illustrated, depend on an isolation value calculated by the device 110.

The isolation value may be calculated between different antennas for different radios of the device during a calibration phase. The isolation may measure the loss of power between transmit of one radio to receive of another. The isolation value may be pairwise (e.g., between an antenna of the first radio and an antenna of the second radio, between a second ratio and third radio, etc.) or may be groupwise (e.g., experienced by an antenna of a third radio when antennas of the first and second radio are both active), or otherwise. The isolation value thus is a value corresponding to impact between the first radio and the second radio (or among radios). Other values may also be used to represent this impact. One technique for measuring (120) the isolation value is shown in FIG. 3 illustrating the calibration phase.

Figure 3:
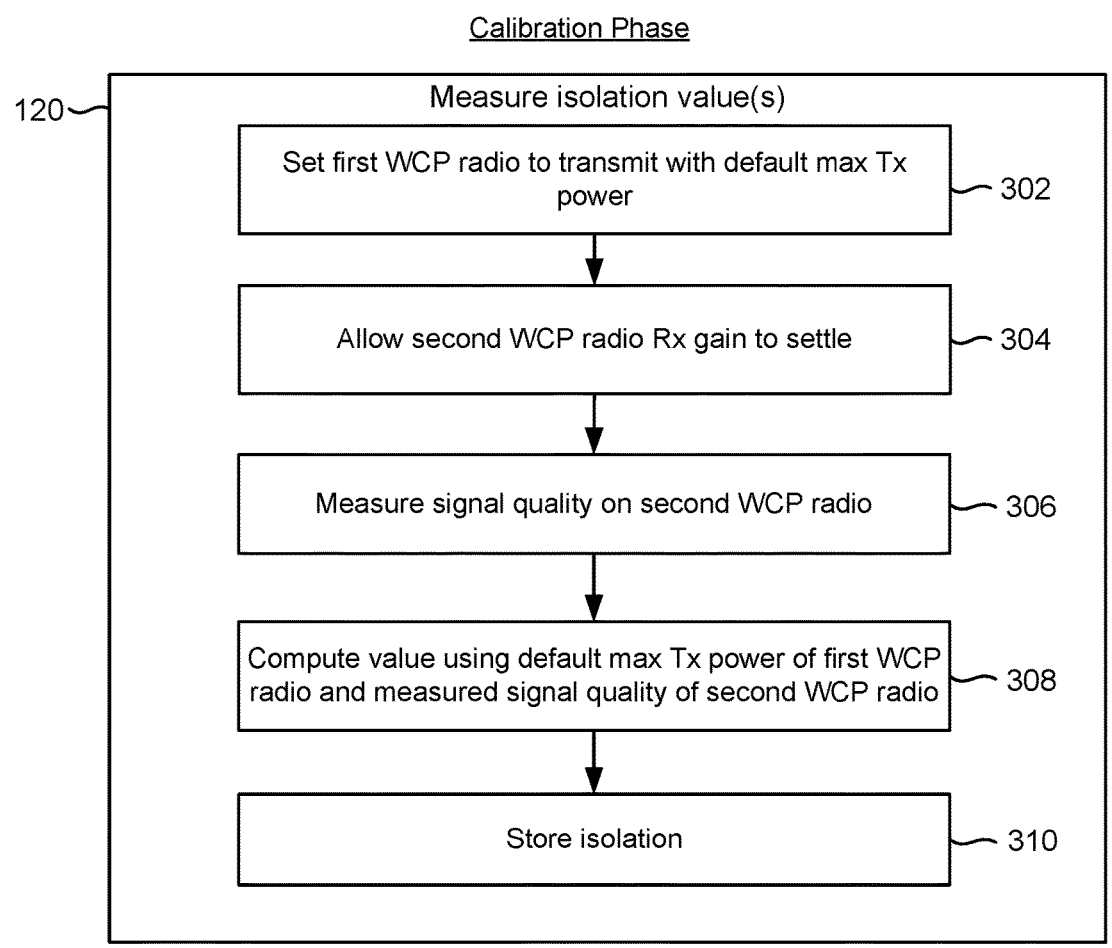
FIG. 3 illustrates a calibration phrase according to embodiments of the present disclosure.

As shown in FIG. 3, to measure (120) the isolation value, the system may set (302) a first WCP radio to transmit a test signal with a default maximum transmit (Tx) power capable for the first WCP radio. The default maximum power may be a result of the radio's configuration as built by the original equipment manufacturer (OEM). A typical default maximum Tx power may, for example, be 10 dBm. The test signal transmission may be within a frequency range detectable by the second WCP radio (for example, Wi-Fi channel 6). The system may then allow (304) the second WCP radio receive (Rx) gain to settle. Once it settles, the system may measure (306) the receive signal quality of the second WCP radio. For example, the system may measure the received signal strength indicator (RSSI) detected by the second WCP radio. An example RSSI measurement, for example, may be −15 dBm. The system may then compute (308) a value representing an impact between the radios using the default max Tx power of the first WCP radio and measured signal quality of the second WCP radio. For example, the system may calculate the isolation value between the first WCP radio and the second WCP radio by subtracting the RSSI from the default max Tx power (e.g., 10 dBm−(−15 dBm)) to arrive at the isolation value (e.g., 25 dB). The device may then store (310) the isolation value, for example as part of a configuration setting to be used by device 110 during an operation phase.

In one example, the different antennas/radios used to test isolation, etc. may be on a test device that has a similar physical radio configuration as device 110. Thus, any measurements taken between radios of the test device (e.g., a first test radio and a second test radio) may be useful for a device 110 during runtime operation when using a first operational radio, second operational radio, etc. Alternatively, the isolation calculation may be done by device 110 itself during some calibration or setup phase. For example, the device 110 may be configured to run the calibration phase at some regular interval (e.g., once a night) or at any point when the antennas/radios are not otherwise in use. During runtime operation with a device 110, actual isolation between the radios may vary (for example due to atmospheric conditions, interference from other devices such as a microwave, etc.) but the isolation value calculated using the techniques herein may still provide a useful comparison point for determining maximum Tx power and Rx gain levels. Further, the calibration phase may be repeated if a device 110 is reset, moved, or detects a significant change in system operation or communication conditions.

During operation, the device 110 may use the isolation value and/or the stored table(s) to regulate the behavior of the radios.

Figure 4:
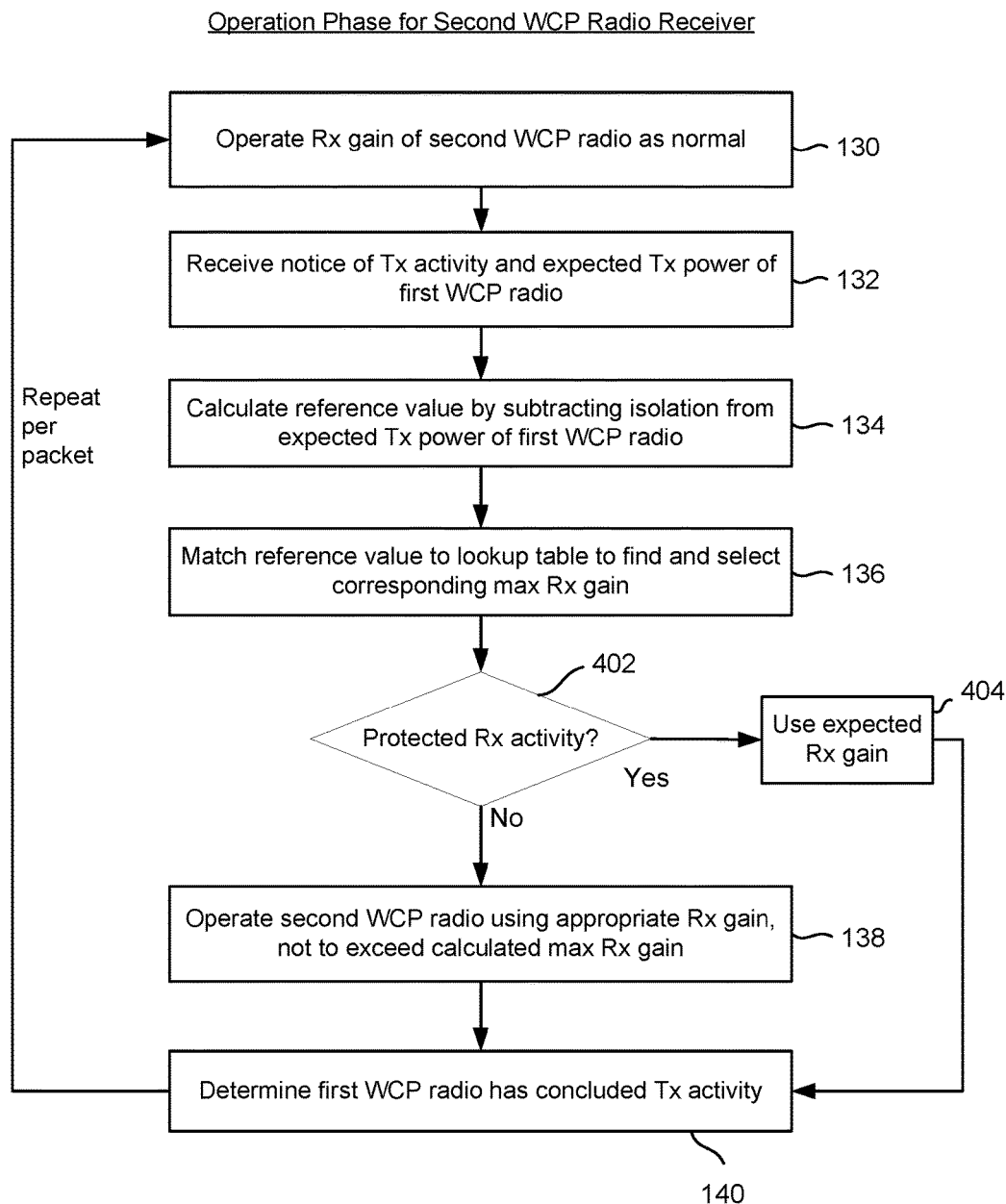
FIG. 4 illustrates techniques for managing wireless communications on a multi-radio wireless communication device according to embodiments of the present disclosure.

As shown in FIG. 4, and discussed above in reference to FIG. 1, the device may regulate the behavior of a receiving radio using the isolation value using WCP controller 250 or another component. First the device 110 may operate (130) the second WCP radio using a receive (Rx) gain normally. The device 110 may then receive (132) notice of a transmit (Tx) activity of the first WCP radio. The notice may include an indication that the first radio is about to transmit a packet along with information about the expected Tx power to be used to transmit that packet. The expected Tx power may be calculated by the first WCP radio or other component based on normal communication operations of the first WCP radio. For example, the WCP controller 650 or other component may receive information from the first WCP radio that the first WCP radio is expected to transmit within the next X ms (or µs) at an expected Tx power.

The device 110 may then calculate (134) a reference value by subtracting the isolation value from the expected Tx power. The device may then match (136) the reference value to a lookup table (such as a table like Table 1 above) to find and select a corresponding maximum Rx gain corresponding to the calculated reference value. The device 110 may then check (402) if the expected Rx activity is one that should be protected, e.g. an activity that should not be subject to the maximum Rx gain. Such a protected Rx activity may be a receive activity that the device determines is sufficiently important that it should continue even if an Rx gain is used that will result in potential interference to the Rx activity given the expected Tx power. Receive activities that may be protected may include activities that maintain a communication link, such as receiving a beacon or other such communications from another device. Whether a receive activity is protected may depend on the configuration of the device 110. If the Rx activity is protected (402: Yes), the device 110 may use (404) the expected Rx gain for the Rx activity as otherwise determined regardless of the max Rx gain. If the Rx activity is not protected (402: No), the device 110 may then operate (138) the second WCP radio using the maximum Rx gain.

The Rx gain may be controlled by a component of the second WCP radio, such as it automatic gain control (AGC) unit or other component. The device 110 may determine an expected Rx gain for the second WCP radio as the device normally would for the receive activity, and may then compare the expected Rx gain to the max Rx gain calculated above using the isolation and expected Tx power. If the expected Rx gain is below the max Rx gain, the second WCP radio may use the expected Rx gain and engage in Rx activity as normal. If, however, the expected Rx gain is above the max Rx gain, the second WCP radio may use the max Rx gain for the receive activity. Also, if the max Rx gain selected in step 136 is above the maximum Rx gain that is physically capable by the components of the second WCP radio, the device may operate as normal with the expected Rx gain for the receive activity. In this way, the second WCP radio may avoid potential interference from the Tx activity of the first WCP radio. The device 110 may then determine (140) that that the first WCP radio has concluded its Tx activity and may return to operating (130) the second WCP radio as normal. For example, the device may re-set or delete the Rx gain to a default value.

The steps above of FIG. 4 may be repeated per packet to be transmitted. For example the device 110 may repeat the steps for a second (or third, etc.) packet to be received and may calculate a different max Rx gain for the second WCP radio each time depending on the Tx activity of the first WCP radio.

Figure 5:
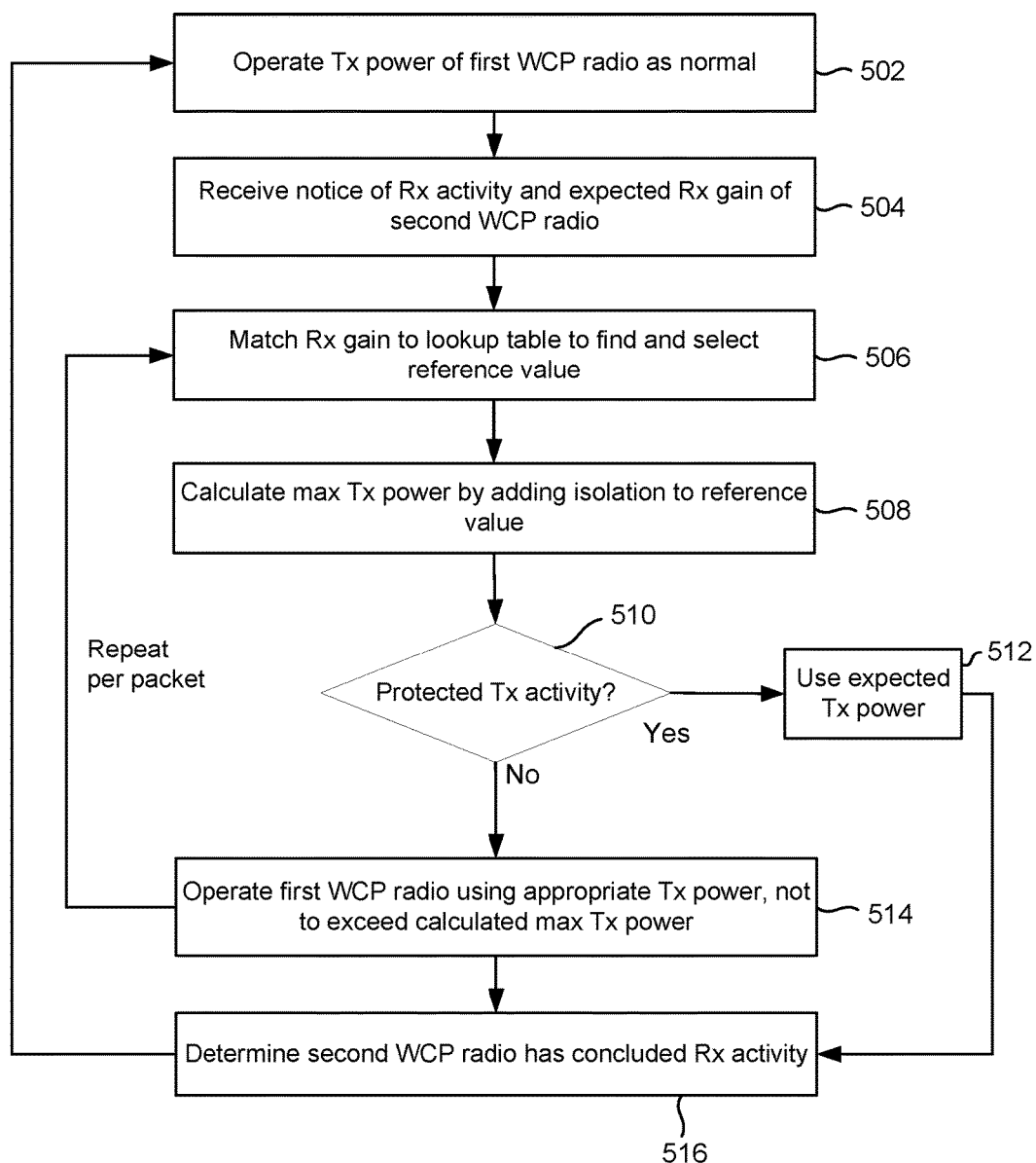
FIG. 5 illustrates techniques for managing wireless communications on a multi-radio wireless communication device according to embodiments of the present disclosure.

As shown in FIG. 5, the device may also regulate the behavior of a transmitting radio using the isolation value using WCP controller 250 or another component. First the device 110 may operate (502) the first WCP radio using a transmit (Tx) power normally. The device 110 may then receive (504) notice of a receive (Rx) activity of the second WCP radio. The notice may include an indication that the second radio is about to receive a packet along with information about the expected Rx gain to be used by the second WCP radio. The expected Rx gain may be calculated by the second WCP radio or other component based on normal communication operations of the second WCP radio. For example, the WCP controller 650 or other component may receive information from the second WCP radio that the second WCP radio is expected to receive within the next X ms (or µs) at an expected Rx gain.

The device 110 may then match (506) the Rx gain to a lookup table (such as a table like Table 2 above) to find and select a corresponding reference value. The device may then calculate (508) a maximum receive (Tx) power for the first WCP radio by adding the isolation value to the reference value obtained from the lookup table. The device 110 may then check (510) if the expected Tx activity is one that should be protected, e.g. an activity that should not be subject to the maximum Tx power. Such a protected Tx activity may be a transmit activity that the device determines is sufficiently important that it should continue even if a Tx power is used that will result in potential interference to Rx activity of some other radio given the expected Tx power of the first WCP radio. Transmit activities that may be protected may include activities that maintain a communication link, such as sending a beacon or other such communications to another device. Whether a transmit activity is protected may depend on the configuration of the device 110. If the Tx activity is protected (510: Yes), the device 110 may use (512) the expected Tx power for the Tx activity as otherwise determined regardless of the max Tx power. If the Tx activity is not protected (512: No), the device 110 may then operate (514) the first WCP radio using the calculated maximum Tx power. Also, if the max Tx power calculated in step 508 is above the maximum Tx power that is physically capable by the components of the first WCP radio, the device may operate as normal with the expected Tx power for the transmit activity.

For example, the device 110 may determine an expected Tx power for the first WCP radio as the device normally would for the transmit activity, and may then compare the expected Tx power to the max Tx power calculated above using the isolation and expected Tx power. If the expected Tx power is below the max Tx power, the first WCP radio may use the expected Tx power and engage in Tx activity as normal. If, however, the expected Tx power is above the max Tx power, the first WCP radio may use the max Tx power for the transmit activity. In this way, the first WCP radio may avoid causing potential interference to the Rx activity of the second WCP radio. The device 110 may then determine (516) that that the second WCP radio has concluded its Rx activity and may return to operating (502) the first WCP radio as normal. For example, the device may re-set or delete the Tx power to a default value.

The steps above of FIG. 5 may be repeated per packet to be transmitted. For example the device 110 may repeat the steps for a second (or third, etc.) packet to be sent and may calculate a different max Tx power for the first WCP radio each time depending on the Rx activity of the second WCP radio.

FIG. 6 is a block diagram conceptually illustrating a device 110 described herein. Device 110 may be a mobile device (such as a phone, tablet, etc.), a speech controlled device (such as a smart home speaker like the Amazon Echo), a larger appliance (such as a refrigerator, washer/dryer, etc.) configured to engage in wireless communications as described above, or any other device that may be used with the described system. Further, the device 110 may include a test device configured to perform operations during a calibration phrase as discussed above. Other devices used in the configuration and manufacture of devices 110 may also be used during the calibration phase. In operation, each of these devices (or groups of devices) may include computer-readable and computer-executable instructions that reside on the respective device, such as those discussed herein.

Device 110 may include one or more controllers/processors (604), that may include a central processing unit (CPU) for processing data and computer-readable instructions, and a memory (606) for storing data and instructions of the respective device. The memory (606) may individually include volatile random access memory (RAM), non-volatile read only memory (ROM), non-volatile magnetoresistive (MRAM) and/or other types of memory. Device (110) may also include a data storage component (608), for storing data and controller/processor-executable instructions. Each data storage component may individually include one or more non-volatile storage types such as magnetic storage, optical storage, solid-state storage, etc. Device (110) may also be connected to removable or external non-volatile memory and/or storage (such as a removable memory card, memory key drive, networked storage, etc.) through respective input/output device interfaces (602).

Computer instructions for operating device (110) and its various components may be executed by the respective device's controller(s)/processor(s) (604), using the memory (606) as temporary "working" storage at runtime. A device's computer instructions may be stored in a non-transitory manner in non-volatile memory (606), storage (608), or an external device(s). Alternatively, some or all of the executable instructions may be embedded in hardware or firmware on the respective device in addition to or instead of software.

Device (110) may include input/output device interfaces (602). A variety of components may be connected through the input/output device interfaces (602), as will be discussed further below. Additionally, device (110) may include an address/data bus (624) for conveying data among components of the device. Each component within the device (110) may also be directly connected to other components in addition to (or instead of) being connected to other components across the bus (624).

Referring to FIG. 6, the device 110 may include input/output device interfaces 602 that connect to a variety of components such as an audio output component such as a speaker 101, a visual output component such as a display 109, a wired headset or a wireless headset (not illustrated), or other component capable of outputting audio. The display 109 may output image and/or video data as described herein. The device 110 may also include an audio capture component. The audio capture component may be, for example, a microphone 607 or array of microphones, a wired headset or a wireless headset 170. The microphone 607 may be configured to capture audio. If an array of microphones is included, approximate distance to a sound's point of origin may be determined by acoustic localization based on time and amplitude differences between sounds captured by different microphones of the array.

For example, via a radio 652 and antenna(s) 614, the input/output device interfaces 602 may connect to one or more networks 199 via a wireless local area network (WLAN) (such as WiFi) radio, Bluetooth, BTLE, ZigBee, wireless network radio, and/or other WCPs, such as a radio capable of communication with a wireless communication network such as a Long Term Evolution (LTE) network, WiMAX network, 3G network, 4G network, etc. A wired connection such as Ethernet may also be supported. Through the network(s) 199, the speech processing system may be distributed across a networked environment. The device 110 may have multiple radios 652, where each radio may include various radio components such as a transceiver that includes a transmitter system and a receiver system and/or other components. Each radio may have one or more dedicated antennas 614 and/or radios may share antennas. Each radio 614 may be configured to communicate with a different WCP. For example a device 110 may have a first radio 652a configured to communicate using a first WCP (e.g., Bluetooth), a second radio 652b configured to communicate using a second WCP (e.g., Wi-Fi), a third radio 652c configured to communicate using a third WCP (e.g., ZigBee), and the like. The multiple radios 652 may allow the device 110 to communicate using multiple WCPs substantially simultaneously by managing interference issues. For example, a first WCP radio may communicate over Bluetooth with wireless headset 170 (or other device) while a second WCP radio may communicate over Wi-Fi with AP 190 (or other device).

The device 110 may also have a WCP controller 650 that can control the radios 652 to avoid interference both among each other internally, and with external signals as described above. The WCP controller 650 may operate to adjust transmit power, receive gain, and perform other operations discussed above, for example in reference to FIGS. 1 and 3-5.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Further, as used in this disclosure a "plurality" of something or a "subset" of something does not necessary mean each and every item in a group or subset unless explicitly stated otherwise. Thus a plurality or a subset may involve some, but not all, of a particular group.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    during a calibration phase:
        transmitting a test signal using a reference transmit power of a first radio of a device, the first radio configured to engage in communications using a first wireless communications protocol (WCP),
        measuring an in-band received signal strength indicator (RSSI) corresponding to the test signal using a second radio of the device, the second radio configured to engage in communications using a second WCP,
        determining a first value based at least in part on the RSSI and the reference transmit power, the first value corresponding to interference to the second radio caused by the first radio, and
        storing the first value; and
    during an operation phase after the calibration phase:
        receiving an indication of transmission activity of the first radio, the indication including an expected transmit power of the first radio,
        determining a maximum receive gain based at least in part on the expected transmit power and the first value,
        determining a first receive gain for first receive activity using the second radio,
        determining the first receive gain is above the maximum receive gain, and
        using the maximum receive gain for the first receive activity.

2. The computer-implemented method of claim 1, wherein:
    the first receive activity happens during a first operation time period; and
    the method further comprises, during a second operation time period:
        receiving a second indication of second receive activity of the second radio, the second indication including a second receive gain of the second radio,
        determining an operational transmit power for the first radio based at least in part on the second receive gain and the first value, and
        engaging in second transmit activity for a first data packet using the first radio and the maximum transmit power.

3. A device comprising:
    a first radio configured to engage in communications using a first wireless communications protocol (WCP);
    a second radio configured to engage in communications using a second WCP;
    at least one processor; and
    at least one computer-readable medium encoded with instructions which, when executed by the at least one processor, cause the device to:
        receive an indication of transmission activity of the first radio, the indication including a transmit power being used by the first radio,
        determine a maximum receive gain for the second radio based at least in part on the transmit power and a stored value corresponding to interference to the second radio caused by the first radio,
        engage in receive activity using the second radio and the maximum receive gain,
        determine a potential receive gain for the receive activity,
        prior to engaging in the receive activity, determine the potential receive gain is more than the maximum receive gain, and
        use the maximum receive gain for the receive activity.

4. The device of claim 3, wherein the at least one computer-readable medium is encoded with additional instructions which, when executed by the at least one processor, further cause the device to:
    subtract the stored value from the transmit power to obtain a reference value;
    identify, in a stored table, a listed receive gain corresponding to the reference value; and
    select the listed receive gain as the maximum receive gain.

5. A device comprising:
    a first radio configured to engage in communications using a first wireless communications protocol (WCP);
    a second radio configured to engage in communications using a second WCP;
    at least one processor; and
    at least one computer-readable medium encoded with instructions which, when executed by the at least one processor, cause the device to:
        receive an indication of transmission activity of the first radio, the indication including a transmit power being used by the first radio,
        determine a maximum receive gain for the second radio based at least in part on the transmit power and a stored isolation value corresponding to a predetermined measurement of isolation between the first radio and the second radio, and engage in receive activity using the second radio and the maximum receive gain.

6. The device of claim 5, wherein the at least one computer-readable medium is encoded with additional instructions which, when executed by the at least one processor, further cause the device to, prior to receiving the indication of transmission activity:

transmit a test signal using a reference transmit power of the first radio;

measure an in-band received signal strength indicator (RSSI) corresponding to the test signal using the second radio;

determine the isolation value based at least in part on the RSSI and the reference transmit power; and store the isolation value.

7. A device comprising:

a first radio configured to engage in communications using a first wireless communications protocol (WCP);

a second radio configured to engage in communications using a second WCP;

at least one processor; and at least one computer-readable medium encoded with instructions which, when executed by the at least one processor, cause the device to:

receive a first indication of transmission activity of the first radio, the first indication including a transmit power being used by the first radio, determine a maximum receive gain for the second radio based at least in part on the transmit power and a stored value corresponding to interference to the second radio caused by the first radio, engage in first receive activity, during a first time period, using the second radio and the maximum receive gain, receive a second indication of second receive activity of the second radio, the second indication including a second receive gain of the second radio, determine a maximum transmit power for the first radio based at least in part on the second receive gain and the stored value, and engage in second transmit activity, during a second time period, for a first data packet using the first radio and the maximum transmit power.

8. The device of claim 7, wherein the at least one computer readable medium is encoded with additional instructions which, when executed by the at least one processor, further cause the device to:

identify, in a stored table, a reference value corresponding to the second receive gain;

add the stored value to the reference value to obtain a listed transmit power; and select the listed transmit power as the maximum transmit power.

9. A device comprising a first radio configured to engage in communications using a first wireless communications protocol (WCP);

a second radio configured to engage in communications using a second WCP;

at least one processor; and at least one computer-readable medium encoded with instructions which, when executed by the at least one processor, cause the device to:

receive an indication of transmission activity of the first radio, the indication including a transmit power being used by the first radio, determine a maximum receive gain for the second radio based at least in part on the transmit power and a stored value corresponding to interference to the second radio caused by the first radio, wherein the stored value further corresponds to interference caused to the second radio by a third radio, and engage in receive activity using the second radio and the maximum receive gain.

10. The device of claim 3, wherein the first radio and the second radio are configured to communicate in a same frequency range of an industrial, scientific and medical (ISM) radio band.

11. A computer-implemented method comprising:

receiving an indication of receive activity of a first radio of a device, the indication including a receive gain of the first radio, the first radio configured to engage in communications using a first wireless communications protocol (WCP);

determining, for a second radio of the device, a transmit power based at least in part on the receive gain and a stored value corresponding to interference to the second radio caused by the first radio, the second radio configured to engage in communications using a second WCP; and engaging in transmit activity for a first data packet using the second radio and the transmit power.

12. The computer-implemented method of claim 11, further comprising:

determining a potential transmit power for the transmit activity;

prior to engaging in the transmit activity, determining the potential transmit power is above the maximum transmit power; and using the maximum transmit power for the transmit activity.

13. The computer-implemented method of claim 11, wherein the stored value corresponds to a predetermined measurement of isolation between the first radio and second radio.

14. The computer-implemented method of claim 13, further comprising, prior to receiving the indication of receive activity:

transmitting a test signal using a reference transmit power of the first radio; and measuring an in-band received signal strength indicator (RSSI) corresponding to the test signal using the second radio;

calculating an isolation value by subtracting the RSSI from the reference transmit power; and storing the isolation value as the stored value.

15. The computer-implemented method of claim 11, further comprising:

identifying, in a stored table, a reference value corresponding to the receive gain;

adding the stored value to the reference value to obtain a listed transmit power; and selecting the listed transmit power as the maximum transmit power.

16. The computer-implemented method of claim 11, wherein:

the transmit activity happens during a first time period; and the method further comprises:

receiving a second indication of second transmit activity of the first radio, the second indication including a second transmit power of the first radio;

determining a maximum receive gain for the second radio based at least in part on the second transmit power and the stored value; and engaging in second receive activity using the second radio and the maximum receive gain.

17. The computer-implemented method of claim 16, further comprising:

subtracting the stored value from the second transmit power to obtain a reference value;

identifying, in a stored table, a listed receive gain corresponding to the reference value; and selecting the listed receive gain as the maximum receive gain.

18. The computer-implemented method of claim 11, wherein the stored value further corresponds to interference caused to the second radio by a third radio.

19. The computer-implemented method of claim 11, wherein the first radio and the second radio are configured to communicate in a same frequency range of an industrial, scientific and medical (ISM) radio band.

20. The method of claim 1, wherein the first value corresponds to a measurement of isolation between the first radio and the second radio, and determining the first value further comprises:

calculating the first value by subtracting the RSSI from the reference transmit power.

21. The method of claim 1, wherein the first value corresponds to a measurement of isolation between the first radio and the second radio, and determining the maximum receive gain further comprises:

subtracting the first value from the expected transmit power to obtain a reference value; and identifying, in a stored table, the maximum receive gain corresponding to the reference value.

22. The method of claim 2, wherein:

the first value corresponds to a measurement of isolation between the first radio and the second radio;

determining the maximum receive gain further comprises:

subtracting the first value from the expected transmit power to obtain a first reference value, and identifying, in a first stored table, the maximum receive gain corresponding to the first reference value; and determining the operational maximum transmit power for the first radio further comprises:

identifying, in a second stored table, a second reference value corresponding to the second receive gain, and adding the first value to the second reference value to obtain an operational maximum transmit power for the first radio.

23. The device of claim 6, wherein the at least one computer-readable medium is encoded with additional instructions which, when executed by the at least one processor, further cause the device to:

determine the isolation value by subtracting the RSSI from the reference transmit power.

* * * * *